United States Patent [19]

Akagi

[11] Patent Number: 4,742,989
[45] Date of Patent: May 10, 1988

[54] MOTOR-DRIVEN FLOW RATE CONTROL VALVE DEVICE

[75] Inventor: Motonobu Akagi, Anjo, Japan

[73] Assignee: Aisin Seiki Kabushiki Kaisha, Kariya, Japan

[21] Appl. No.: 14,846

[22] Filed: Feb. 13, 1987

[30] Foreign Application Priority Data

Feb. 21, 1986 [JP] Japan .................. 61-23951[U]

[51] Int. Cl.$^4$ ............................................. F16K 31/04
[52] U.S. Cl. .................. 251/129.05; 251/129.11; 251/129.12
[58] Field of Search ............ 251/129.11, 129.05, 251/129.12

[56] References Cited

U.S. PATENT DOCUMENTS 4,097,786  6/1978  Lund ................. 251/129.11 X
4,494,517  1/1985  Kratt et al. .......... 251/129.11 X Primary Examiner—Arnold Rosenthal
Attorney, Agent, or Firm—Oblon, Fisher, Spivak, McClelland & Maier

[57] ABSTRACT

A motor-driven flow rate control valve device which includes a housing, a valve, a valve shaft, a return spring and a step motor. The housing has its inlet and outlet. The valve is disposed in a passage formed in the housing and is capable of keeping communication between the inlet and the outlet under control by its opening and closing action. The valve shaft is axially slidable in the housing and has a first end thereof linked to the valve. The return spring is held by a holder which includes a first end thereof secured to the housing and a second end thereof secured to a second end of the valve shaft. The return spring constantly forces the valve to move in a valve closing direction. The step motor is fixed through a motor housing to the housing and subsumes a rotor equipped with a screw mechanism for converting a rotary motion of the step motor into an axial motion of the motor shaft. One end of the motor shaft impinges upon the second end of the valve shaft. In this construction, there is provided an improvement characterized in that a spiral spring is spanned between an end portion of the rotor of the step motor and a fixation end of the motor housing. With such an arrangement, a so-called open locking state wherein the valve is locked in an open state is not created.

2 Claims, 3 Drawing Sheets

MOTOR-DRIVEN FLOW RATE CONTROL VALVE DEVICE

BACKGROUND OF THE INVENTION

1. Field of the Invention:

The present invention relates to a motor-driven flow rate control valve device suitable for an EGR (Exhaust Gas Recirculation) control system.

2. Description of the Prior Art:

FIG. 4 shows one example of a conventionallly proposed step motor valve designed for controlling the EGR control. A housing 41 includes an inlet 42 communicating with an exhaust system of an engine and an outlet 43 communicating with an admission system thereof. Exhaust gas discharged from the engine passes from the inlet 42 through a reflux passage 44 and further flows from the inlet 42 to the admission system, thus recirculating the exhaust gas. A valve 45 is so provided in the reflux passage 44 as to be capable of impinging upon a seat member 46. The amount of recirculation of the exhaust gas flowing through the reflux passage 44 is regulated by this valve 45.

A valve shaft integral with the valve 45 is so disposed as to be swayable in the axial direction with the help of a bearing 49 which is installed through the intermediary of a holder member 48. To be specific, the valve 45 assumes a so-called poppet valve structure wherein it is driven in an open direction with the result that separation from the seat member 46 is made. To the right end portion of the valve shaft 47 is fixed a spring holder 50 for holding a return spring 51. The valve 45 is constantly forced to move to a closing position by the return spring 51, viz., in a direction in which the valve 45 can impinge upon the seat member 46.

On the other hand, a motor housing 53 is joined through an insulator 52 to the right end of the housing 41. The motor housing 53 accommodates a step motor 54. This step motor 54 is capable of controlling the rotation in forward and reverse directions at rotary angles step by step in response to electric signals transmitted from a computer, and this rotary motion is converted into a linear motion by means of an internal screw 55. Videlicet, when the step motor 54 is rotated leftwardly under predetermined pulse control in the case of its being viewed from the direction indicated by an arrowhead B, the motor shaft 56 is moved by the internal screw 55 in the direction pointed by the arrowhead B, thereby propagating the driving force which acts in the open direction via the valve shaft 47 to the valve 45. At this time, since a load of installation of the return spring 51 is set so as to be small as compared with the driving force of the step motor 54, opening of the valve 45 can be controlled, overcoming the spring force of the return spring 51. It is to be noted that the reference numeral 57 stands for a cooling air layer.

The above-mentioned computer converts a car speed indicating an operating condition of the engine the number of rotation thereof, a temperature thereof and an aperture of a throttel into electric signals, and then transmits them to the step motor 54. The step motor 54 is capable of controlling the rotationin the forward and reverse directions step by step in response to the electric signals, and it is therefore feasible to effect position control of the motor shaft 56, i.e., the axial position control of the valve shaft 47 in a highly accurate manner. Consequently, the amount of EGR can surely be controlled with high accuracy in accordance with the operating condition of the engine.

The above-described conventional mechanism is, however, characterized by a disadvantage in that the valve 45 is locked as it remains open in the event of disconnection or a motor problems such as damage in the screw mechanism, which causes problems such as inferiority both in drivability and in emission.

SUMMARY OF THE INVENTION

It is the primary object of the present invention which obviates the above-described problem inherent in a conventional step motor-driven valve designed for EGR control wherein the valve is locked as it remains open if a motor problems occur, by providing, in a motor-driven flow rate control valve device which comprises: a housing having an inlet and an outlet; a valve disposed in a passage formed in the housing, this valve being capable of keeping communication between the inlet and the outlet under control by its opening and closing action; a valve shaft so disposed as to be axially slidable in the housing, said valve shaft having one end thereby linked to the valve; a return spring seized by a holder having one end thereby secured to the housing and the other end secured to a second end of the valve shaft, this return spring constantly forcing the valve to move in a valve closing direction; and a step motor fixed through a motor housing to the housing, this step motor subsuming a rotor equipped with a screw mechanism for converting a rotary motion of the step motor into an axial motion of the motor shaft, the motor shaft including one end that impinges upon the second end of the valve shaft, and which includes an improvement characterized in that a spiral spring is interposed between an end portion of the rotor of the step motor and a fixation end of the motor housing.

In the situation where a coil and a lead wire are disconnected or a supply of electricity to the step motor is shut off because of a computer trouble, holding torque of the rotor comes to a level at which no electricity is supplied. Hence, rotation of the rotor is forcibly reversed by dint of turning moment of the spiral spring, thereby retracting the motor shaft to the initial position. At this time, the valve shaft is reverted to the valve-closing position by the return spring. With this arrangement, any inconvenience such as an open locking state is not created.

These and other objects, features and advantages of the invention will become more apparent on reading the following detailed description with reference to the accompanying drawings.

Figure 1:
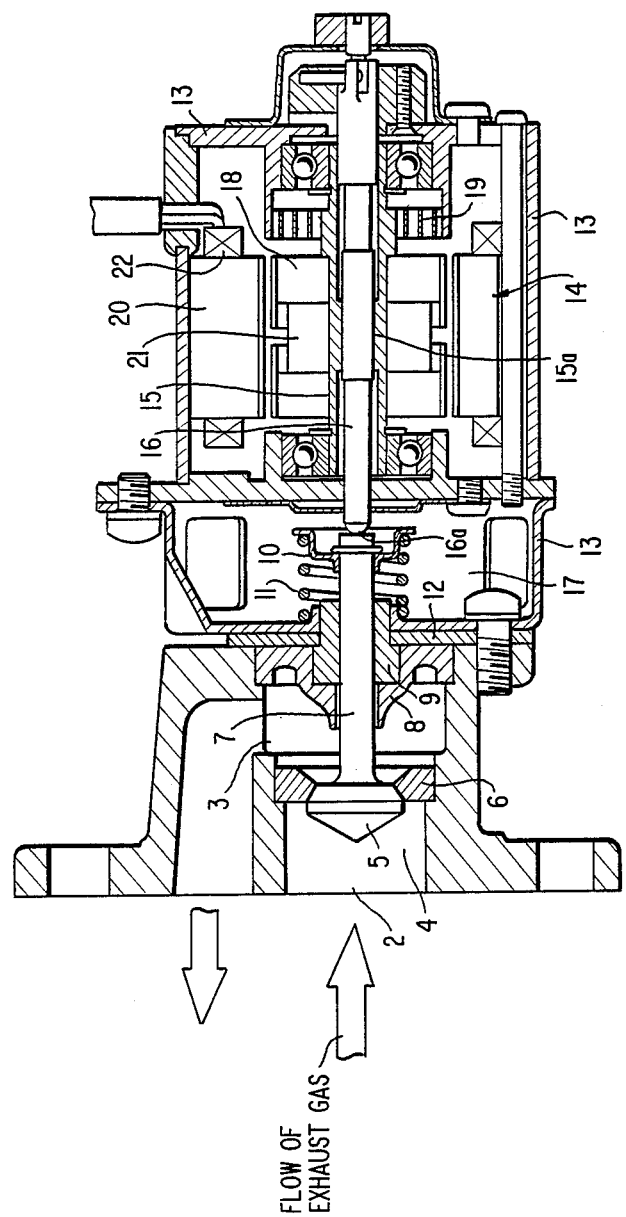
FIG. 1 is a side sectional view of a motor-driven flow rate control valve device, showing one embodiment of the present invention.

DESCRIPTION OF THE PREFERRED EMBODIMENT:

One embodiment of the present invention will hereinafter be described with reference to the accompanying drawings.

A housing 1 is formed with an inlet 2 and an outlet 3. In a reflux passage formed within the housing 1 is installed a valve 5 capable of impinging upon a seat member 6 secured to the reflux passage 4. This valve 5 can maintain communication between the inlet 2 and the outlet 3 under control by a step wherein the valve opens and closes. In such an arrangement, a motor-driven flow rate control valve device according to the present invention is applied to an EGR (Exhaust Gas Recirculation) control system. Namely, where the inlet 2 communicates with an exhaust system of an engine and the outlet 3 likewise communicates with an admission system thereof, an exhaust gas discharged from the engine passes from the inlet 2 through the reflux passage 4 and then flows from outlet 3 to the admission system, thus recirculating the exhaust gas. The amount of recirculation of the exhaust gas running through the reflux passage 4 is controlled by means of the valve 5.

The valve 5 is so shaped as to be integral with a valve shaft 7 extending in a direction opposite to the inlet 2. The valve shaft 7 is disposed so that it is slidable in the axial direction with the aid of a bearing 9 provided through a holder member 8 fixed to the housing 1. In this manner, the valve 5 assumes a so-called poppet valve structure wherein the valve is driven in the valve opening direction while being separated from the seat member 6 by dint of the valve shaft 7. At the same time, the valve 5 is forced to move to the valve closing position, viz., in a direction in which it invariably impinges upon the seat member 6 by a return spring 11 held by a spring holder 10 secured to the right end portion of the valve shaft 7 which end jutts out from the housing 1.

A motor housing 13 is linked through an insulator 12 to the right end portion of the housing 1. The motor housing 13 accomodates a step motor 14. The step motor 14 is capable of controlling rotation in forward and reverse directions at rotary angles step by step in response to electric signals transmitted from a computer. This step motor 14 has also a rotor 18 equipped with an internal screw 15 for converting a rotary motion into an axial motion. A motor shaft 16 formed with screw threads fittable to the internal screw 15 is fitted in the internal screw 15 of the rotor 18. The internal screw 15 and the screw threads formed on the motor shaft 16 are thus combined to constitute a screw mechanism 15a which converts the rotational motion of the step motor 14 into the axial motion of the motor shaft 16. One end of the motor shaft takes a spherical shape and impinges upon the end portion of the valve shaft 7 at one coaxial point. In this configuration, the rotation of the step motor 14 is controlled in conformity with predetermined pulse control, thereby axially moving the motor shaft 16. Then the valve 5 is so driven as to open and close through the valve shaft 7, at which time a load of installation of the return spring 11 is set to a value which is smaller than the driving force of the step motor 14.

The insulator 12 is prepared with a view to preventing heat evolved from the housing 1 from being conducted to the motor housing 13, and further a cooling air layer 17 is formed between a fixation end of the motor housing 13 on the side of the housing 1 and the step motor 14 for the purpose of hindering thermal conduction to the step motor 14. An external surface of the motor housing 13 is formed with a plurality of notches intended to communicate with the outside air space.

Figure 2:
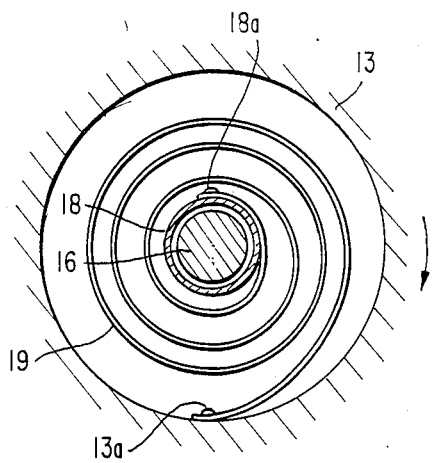
FIG. 2 is an elevational view of a spiral spring thereof.

A spiral spring 19 both ends of which are secured to the motor housing 13 and to the rotor 18 of the step motor 14 is, as illustrated in the plan view of FIG. 2, interposed between the end portion of the rotor 18 and the fixation end of the motor housing 13. That is, it is of importance to design this spiral spring 19 so that the moment property thereof is sufficiently smaller than the holding torque obtained when the electricity is supplied and is greater than the holding torque obtained when no electricity is supplied with respect to the least value thereof within a range of effective rotary angles. The step motor 14 is composed of the rotor 18, a stator 20, a permanent magnet 21, the internal screw 15 and a coil 22.

Figure 3:
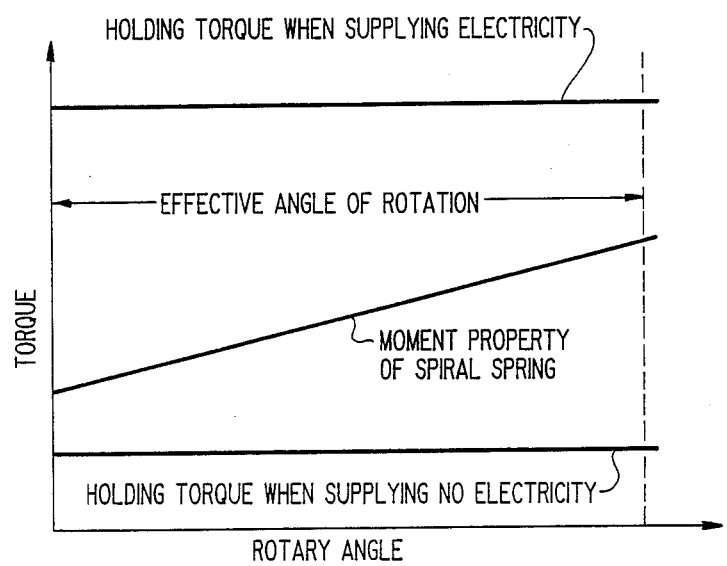
FIG. 3 is a diagram showing a relation between a rotary angle and torque in the motor-driven flow rate control valve device according to the present invention.
Figure 4:
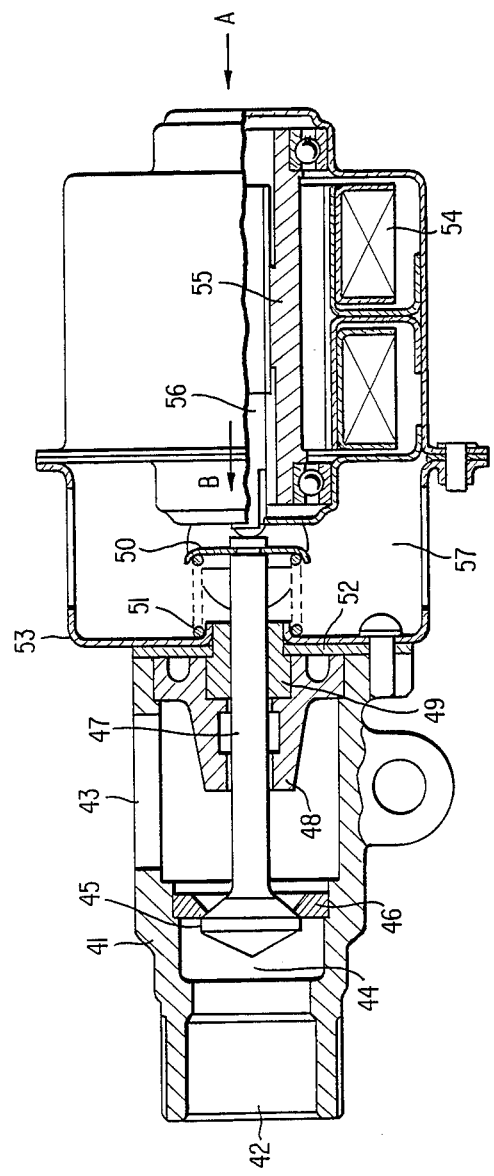
FIG. 4 a side sectional view of a conventional step motor-driven valve designed for EGR control.

In the thus arranged embodiment, when the coil and the lead wire are disconnected or the supply of electricity to the step motor 14 is shut off on account of the computer trouble and the like, the holding torque of the rotor 18, as shown in FIG. 3, assumes a level at which the no electricity is fed. Subsequently, the rotation is forced to be reversed by the rotary moment of the spiral spring 19, thereby retracting the motor shaft 16 to the initial position. At this time, the valve shaft 7 is made to revert to the valve closing position by the spring force of the return spring 11 and hence no inconvenience as an open locking state is produced.

As can be clarified from the description so far made, the present invention yields the following favourable effects. In case that a problem in functioning of the step motor is brought about, the valve shaft reverts to the valve closing position with the help of the return spring and there is no problem such as the foregoing open locking state wherein the valve is locked as it remains open. The problems incidental to the conventional device do not arise at all due to such advantages.

As many apparently widely different embodiments of this invention may be made without departing from the spirit and scope thereof, it is to be understood that the invention is not limited to the specific embodiments thereof except as defined in the appended claims.

What is claimed is:

1. A motor-driven flow rate control valve device comprising: a housing having an inlet and an outlet; a valve disposed in a passage formed in said housing, said valve being adapted to maintain controlled communication between said inlet and said outlet by opening and closing action; a valve shaft so disposed as to be axially slidable in said housing, said valve shaft including a first end thereof linked to said valve; a return spring which has a first end thereof secured to said housing and a second end thereof secured to said second end of said valve shaft, said return spring constantly forcing said valve to move in a valve closing direction; and a step motor fixed through a motor housing to said housing, said step motor comprising a rotor equipped with a screw mechanism for converting rotary motion of said step motor into an axial motion of said motor shaft, said motor shaft including an end portion which impinges upon said second end of said valve shaft, and a sprial spring positioned between an end portion of said rotor of said step motor and an end portion of said motor housing wherein impingement surfaces of said motor shaft and said valve shaft are of a spherical configuration and wherein said screw mechanism comprises an internal screw formed on said rotor and a plurality of screw threads formed on said motor shaft and directly engaged with said internal screw.

2. A motor-driven flow rate control valve device as set forth in claim 1, wherein a moment force of said spherical spring is sufficiently smaller than the holding torque of said step motor when electricity is supplied and is greater than the holding torque thereof when no electricity is supplied with respect to a minimum value thereof wihtin a range of effective rotary angles of said step motor.

* * * * *